(12) United States Patent
Cho et al.

(10) Patent No.: US 7,988,936 B2
(45) Date of Patent: Aug. 2, 2011

(54) CHEMICAL REACTOR INCLUDING HEAT EXCHANGERS

(75) Inventors: Jun Yeon Cho, Daejeon (KR); Jae Hoon Choe, Daejeon (KR); Kwang Cheon Park, Daejeon (KR); Gyea-Young Kwak, Daejeon (KR); Chang Houn Rhee, Daejeon (KR); Sun Hvuk Bae, Daejeon (KR); Jung Uk Choi, Daejeon (KR); Kwang Ho Song, Sungnam-si (KR)

(73) Assignee: LG Chem, Ltd., Seoul (KR)

( * ) Notice: Subject to any disclaimer, the term of this patent is extended or adjusted under 35 U.S.C. 154(b) by 253 days.

(21) Appl. No.: 12/309,400

(22) PCT Filed: Jul. 19, 2007

(86) PCT No.: PCT/KR2007/003483
§ 371 (c)(1),
(2), (4) Date: Jun. 1, 2009

(87) PCT Pub. No.: WO2008/010672
PCT Pub. Date: Jan. 24, 2008

(65) Prior Publication Data
US 2009/0311150 A1    Dec. 17, 2009

(30) Foreign Application Priority Data
Jul. 21, 2006  (KR) .................. 10-2006-0068611

(51) Int. Cl.
*B01J 8/00* (2006.01)
*B01J 10/00* (2006.01)
*B01J 8/04* (2006.01)
*B01J 19/00* (2006.01)

(52) U.S. Cl. ........ 422/600; 422/601; 422/602; 422/603; 422/630; 422/640; 422/649; 422/129; 422/130; 422/198

(58) Field of Classification Search .......... 422/600–603, 422/630, 640, 649, 129, 130, 198
See application file for complete search history.

(56) References Cited

U.S. PATENT DOCUMENTS

| | | | |
|---|---|---|---|
| 6,419,884 B1 * | 7/2002 | Strobel et al. ................. | 422/626 |
| 6,998,096 B2 | 2/2006 | Ishikawa | |
| 7,048,897 B1 | 5/2006 | Koripella et al. | |
| 2002/0071797 A1 | 6/2002 | Loffler et al. | |
| 2005/0193628 A1 | 9/2005 | Kim et al. | |
| 2006/0046113 A1 * | 3/2006 | Wang et al. ..................... | 429/20 |

FOREIGN PATENT DOCUMENTS
KR   1999-014655   1/2001
* cited by examiner

*Primary Examiner* — Walter D Griffin
*Assistant Examiner* — Natasha Young
(74) *Attorney, Agent, or Firm* — McKenna Long & Aldridge LLP

(57) ABSTRACT

The present invention discloses to a chemical reactor with high heat efficiency and small volume, the chemical reaction of the present invention comprises a first unit for performing heat exchange of exothermic reaction products with exothermic reaction raw material fed for exothermic reaction; a second unit including a plate assembly for exothermic reactions and a plate assembly for endothermic reactions; and a third unit for performing heat exchange of endothermic reaction products with endothermic reaction raw material fed for endothermic reactions.

12 Claims, 4 Drawing Sheets

US 7,988,936 B2

CHEMICAL REACTOR INCLUDING HEAT EXCHANGERS

This application claims priority to PCT/KR2007/003483 filed on Jul. 19, 2007 and also Korean Patent Application No. 10-2006-0068611 filed on Jul. 21, 2006, the contents of which are hereby incorporated by reference in their entirety.

TECHNICAL FIELD

The present invention relates to a chemical reactor with high heat efficiency and small volume. More particularly, the present invention relates to a chemical reactor which may be miniaturized and can heat-exchange effectively to improve heat efficiency, and thus effectively used in a reactor module for reforming hydrocarbons, and the like

BACKGROUND ART

Recently, interest of environment problems is increased and thus researches for fuel cells and the like are vigorously conducted as alternatives to gasoline engines and fossil-fuel generation. In order to increase availability of fuel cells, every condition should be provided, which can smoothly produce and/or feed hydrogen used in fuels.

Since hydrogen is the lightest among gases and can be easily exploded in air, its storage and handling are very difficult. Therefore, it is in the currently technical level to feed hydrogen simply using large volumes of hydrogen storage tanks. Such hydrogen storage tanks have disadvantages which are difficult to completely solve the previously mentioned problems.

In addition, there is a disadvantage that initial equipment investments such as developing large volumes of hydrogen storage tanks and preparing larger volumes of hydrogen reservoirs should be vastly required. It cannot help being such a vast project as would be discussed as infrastructures in a national level.

Therefore, a plan of miniaturizing a chemical reactor such as a reforming reactor producing hydrogen to reduce weight and volume is very desirable in that hydrogen may be used in clean fuels without requiring vast equipment investments.

Production apparatuses of hydrogen for feeding it into fuel cells roughly consist of three units. That is, they may be divided by a reformer for reforming fuels to produce hydrogen, carbon dioxide and carbon monoxide, a water gas shift reactor for reacting carbon monoxide with a steam to lower a concentration of carbon monoxide to 1% and increase a concentration of hydrogen, and a selective CO oxidation reactor for lowering a concentration of the remaining carbon monoxide to 10 ppm or less.

Especially, in case of a steam reforming reaction, the reaction is an endothermic reaction performed at a high temperature of 650° C. or more, and thus needs sustained heat supply. As heat supply sources, burners are used or catalytic combustion is utilized. In addition, the water gas shift reaction occurs at a temperature of 250 to 450° C., so that heat exchange of reformed gases discharged via the reformer is necessary.

Furthermore, when the catalytic combustion is utilized, it is advantageous to inject the pre-heated combustion gases, and also advantageous to pre-heat and inject the reforming fuels. For such pre-heating, separate pre-heaters should be used or the combustion gases or the reforming fuels should be heat-exchanged with burned stack gases or reforming gases exited from the reformer.

In KR Unexamined Patent Publication No. 1999-014655, a reformer, which could heat the reformer using combustion catalysts and simultaneously perform a function of developing steam and a function of pre-heating a mixture of air and fuels using heat of stack gases, was prepared. However, a heat exchanger is separately disposed so that heat loss occurred in the middle cannot be prevented. Therefore, it has disadvantages that heat efficiency is lowered and that the apparatus is complicated.

In U.S. Pat. No. 6,998,096 B2, a burner, a reformer, a heat exchanger and an evaporator were integrally constituted to increase heat efficiency. However, said technique has disadvantages that the reactor has so large volume that heat loss through wall surfaces cannot help being large, and the heat exchanger is positioned on top of the reformer and thus heat loss becomes large through the side wall surfaces of the relatively wide reformer.

DISCLOSURE OF THE INVENTION

The present invention is conceived to solve the problems of heat loss of the chemical reactors such as reforming reaction apparatuses described above, an object of the present invention to provide an integral type reactor module having a more simple structure.

To achieve the above object, the present invention uses plates with fluid passages through which fluids could pass and has a flow of fluids designed for achieving the effective heat exchange to minimize fluid lines exposed to an outside. In addition, the chemical reactor of the present invention utilizes micro channels to increase heat transfer efficiency.

The chemical reactor according to the present invention comprises a first unit including one or more heat exchange plate assemblies for exothermic reaction raw material and one or more heat exchange plate assemblies for exothermic reaction products, a heat exchange between exothermic reaction products and exothermic reaction raw material being performed in the first unit;

a second unit including one or more plate assemblies for exothermic reaction and one or more plate assemblies for endothermic reaction, the second unit providing heat generated through an exothermic reaction of said exothermic reaction raw material to endothermic reaction raw material to proceed the endothermic reaction; and a third unit including one or more heat exchange plate assemblies for endothermic reaction raw material and one or more heat exchange plate assemblies for endothermic reaction products, a heat exchange between endothermic reaction products and endothermic reaction raw material being performed in the third unit.

The term "exothermic reaction raw material" used herein means raw material (for example, combustion gases) to be used in exothermic reactions such as combustion reactions, and the term "exothermic reaction products" means a state (for example, burned combustion gases [stack gases]) after subjecting the "exothermic reaction raw material" to exothermic reactions. In addition, the term "endothermic reaction raw material" means raw material (for example, hydrocarbon or alcohol) to be used in endothermic reactions such as reforming reactions of hydrocarbons, and the term "endothermic reaction products" means a state (for example, reforming gases) after subjecting the "endothermic reaction raw material" to endothermic reactions.

In particular, the chemical reactor of the present invention as mentioned above may be effectively used as a reactor module for reforming hydrocarbons which reforms hydrocarbon raw material to produce hydrogen. At this time, in the chemical reaction of the present invention, the exothermic reaction is a combustion reaction of combustion gases, and endothermic reaction is a reforming reaction for reforming hydrocarbon raw material to produce hydrogen.

In the chemical reactor of the present invention as described above, it is preferably to minimize a flow of fluids to be exposed to an outside, by means of the first and fourth plates placed on the first unit and below the third unit, respectively and the second and third plates having through holes and placed between two units, respectively.

Specifically, the chemical reactor according to the present invention further comprises, preferably, a first plate for supplying exothermic reaction raw material to the heat exchange plate assembly for exothermic reaction raw material and discharging exothermic reaction products introduced from the heat exchange plate assembly for exothermic reaction products;

a second plate for supplying exothermic reaction raw material introduced from the heat exchange plate assembly for exothermic reaction raw material to the plate assembly for exothermic reaction, and discharging endothermic reaction raw material and exothermic reaction products introduced from a third plate to the plate assembly for endothermic reaction and the heat exchange plate assembly for exothermic reaction products, respectively;

a third plate for supplying endothermic reaction raw material introduced from the heat exchange plate assembly for exothermic reaction raw material and exothermic reaction products introduced from the plate assemblies for exothermic reaction to the second plate, and supplying endothermic reaction products introduced from the plate assembly for endothermic reaction to the heat exchange plate assembly for endothermic reaction products; and a fourth plate for supplying endothermic reaction raw material to the heat exchange plate assembly for endothermic reaction raw material, and discharging endothermic reaction products introduced from the heat exchange plate assembly endothermic reaction products.

Considering the volume of reactor, in addition, it is preferably that the first plate, the first unit, the second plate, the second unit, the third plate, the third unit and the fourth plate are laminately disposed order in the chemical reactor of the present invention. Also, it is preferably that the heat exchange plate assemblies for exothermic reaction raw material and the heat exchange plate assemblies for exothermic reaction products constituting the first unit are alternately laminated, the plate assemblies for exothermic reaction and the plate assemblies for endothermic reaction constituting the second unit are alternately laminated, the heat exchange plate assemblies for endothermic reaction raw material and the heat exchange plate assemblies for endothermic reaction products constituting the third unit are alternately laminated, respectively.

Further, considering heat exchange ability, in each plate assembly constituting said first to third units, it is preferably that the first channel plate having one or more micro channels formed on a lower surface thereof and the second channel plate having one or more formed on an upper surface thereof and corresponding micro channels of the first plate are joined to form one or more micro fluid passages.

BEST MODE FOR CARRYING OUT THE INVENTION

The present invention is explained in detail below, with reference to the accompanying drawings.

Figure 1:
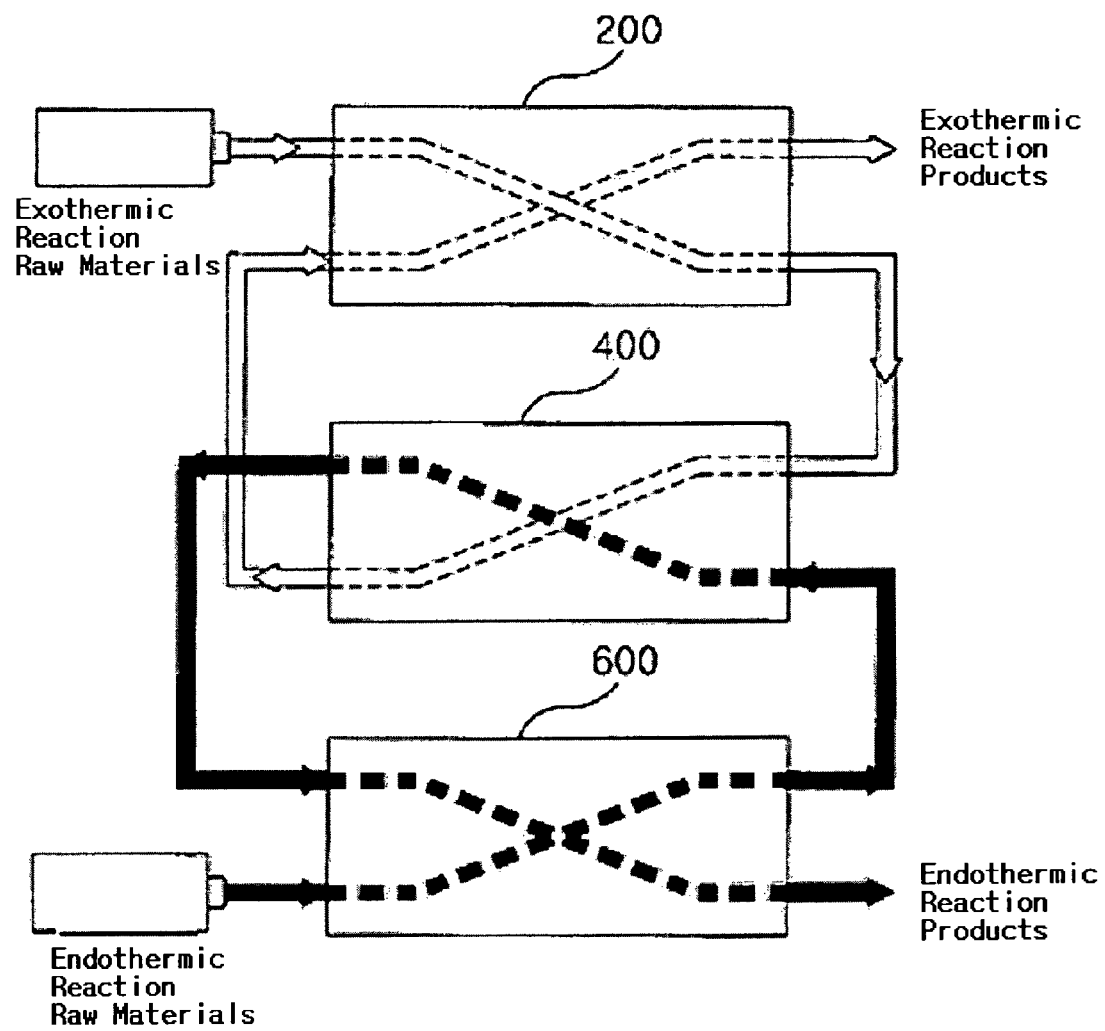
FIG. 1 is a view schematically depicting an entire structure of the chemical reactor according to the present invention.

FIG. 1 is a view schematically depicting an entire structure of a chemical reactor according to the present invention. As shown in FIG. 1, the chemical reactor of the present invention comprises a first unit 200 for performing heat exchange of exothermic reaction products with exothermic reaction raw material fed for exothermic reaction; a second unit 400 including a plate assembly for exothermic reaction and a plate assembly for endothermic reaction; and a third unit 600 for performing heat exchange of endothermic reaction products with endothermic reaction raw material fed for endothermic reaction. At this time, the exothermic reaction raw material discharged from the first unit are fed into the plate assembly for exothermic reactions in the second unit and used in the exothermic reactions, the exothermic reaction products is fed into the first unit to pre-heat the exothermic reaction raw material, the endothermic reaction raw material discharged from the third unit are fed into the plate assembly for endothermic reactions in the second unit and used in the endothermic reactions, and the endothermic reaction products is fed into the third unit to pre-heat the endothermic reaction raw material.

The chemical reactor of the present invention as described above may be used, for example, as a reactor module for reforming hydrocarbons. The exothermic reaction is a combustion reaction of combustion gases, and the endothermic reaction is a reaction for reforming hydrocarbon raw material to produce hydrogen. In this reforming reaction, the exothermic reaction raw material, exothermic reaction products, endothermic reaction raw material and endothermic reaction products correspond to combustion gases, burned stack gases, fuels and reforming gases, respectively.

Figure 2:
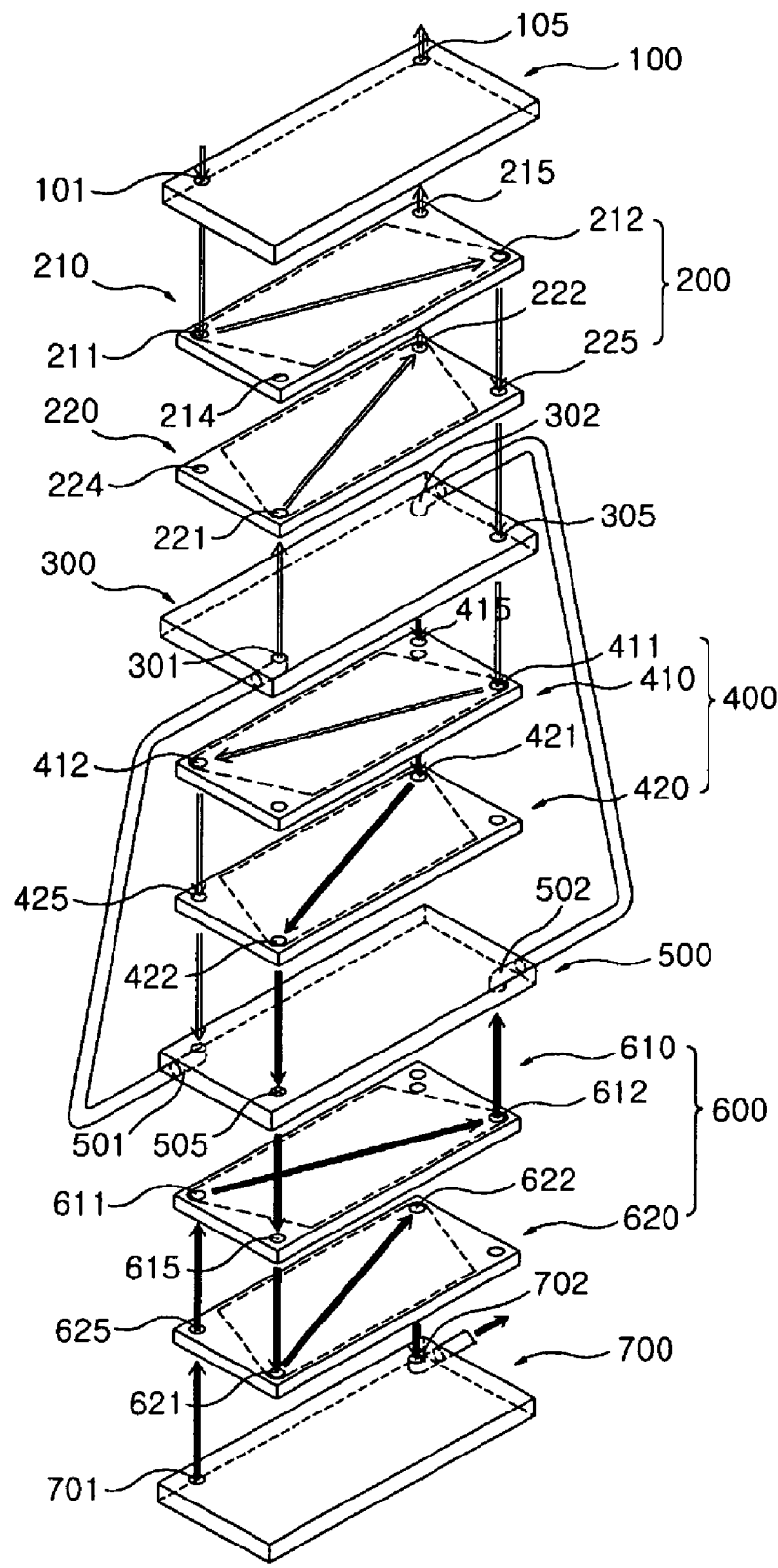
FIG. 2 is an exploded perspective view of the chemical reactor according to one aspect of the present invention.

FIG. 2 is an exploded perspective view of a chemical reactor according to the present invention, the chemical reactor comprises;

a first plate 100 which exothermic reaction raw material is fed, exothermic reaction products being discharged from the first plate;

a first unit 200 including a heat exchange plate assembly 210 for exothermic reaction raw material to which exothermic reaction raw material discharged from the first plate 100 is in-flowed and a heat exchange plate assembly 220 for exothermic reaction products to which exothermic reaction products discharged from the second plate 300 is in-flowed;

a second plate 300 for feeding exothermic reaction raw material in-flowed from the first unit 200 into a plate assembly 410 for exothermic reactions and feeding endothermic reaction raw material in-flowed from a third plate 500 into a plate assembly 420 for endothermic reactions, exothermic reaction products discharged from the third plate 500 being in-flowed to the second plate;

a second unit 400 including a plate assembly 410 for exothermic reactions to which exothermic reaction raw material discharged from the second plate 300 is in-flowed and a plate assembly 420 for endothermic reactions to which endothermic reaction raw material are in-flowed;

the third plate 500 for discharging exothermic reaction products exited from the second unit 400 into the second plate 300, feeding endothermic reaction products exited from the second unit 400 into a third unit 600, and discharging endothermic reaction raw material in-flowed from the third unit 600 into the second plate 300;

a third unit 600 including a heat exchange plate assembly 620 for endothermic reaction products to which endothermic reaction products discharged from the third plate 500 is in-flowed and a heat exchange plate assembly 610 for endothermic reaction raw material to which endothermic reaction raw material discharged from the fourth plate 700; is in-flowed; and the fourth plate 700 for discharging endothermic reaction products, endothermic reaction raw material being fed into the fourth plate.

The configuration of each member and the interconnection among the members constituting the chemical reactor according to the present invention are explained in detail, via the attached drawings below.

The First Plate 100

The first plate 100 acting as a top cover of the chemical reactor and feeding exothermic reaction raw material and discharging exothermic reaction products is a flat-shaped member, and is equipped with an inflow port 101 to which exothermic reaction raw material is introduced and an exhaust port 105 through which exothermic reaction products is discharged are formed at both side ends thereof. In addition, lower ends of the inflow port 101 and the exhaust port 105 are connected to the first unit 200 described below.

The First Unit 200

The first unit 200 is a part in which exothermic reaction raw material is heat exchanged with exothermic reaction products and positioned below the first plate 100. The first unit 200 includes the heat exchange plate assembly 210 for exothermic raw material to which the exothermic reaction raw material is in-flowed, and the heat exchange plate assembly 220 for exothermic reaction products to which exothermic reaction products is in-flowed. Each heat exchange plate assembly is constituted by coupling the first channel plate with the second channel plate, and the first and second channel plate have the same structure and are present in a mirror image. When the first channel plate and the second channel plate are overlapped, concave portions formed on an inner surface of the first channel plate and concave portions formed on an inner surface of the second channel plate correspond to each other to form one or more micro fluid passages.

The inflow port 101 of the first plate 100 is connected to an inlet 211 formed on the heat exchange plate assembly 210 for exothermic reaction raw material, and an outlet 212 formed on the heat exchange plate assembly 210 for exothermic raw material is connected to a through-hole 225 formed on the heat exchange plate assembly 220 for exothermic reaction products. Therefore, the exothermic reaction raw material in-flowed from the first plate 100 flows along the fluid passages formed in the heat exchange plate assembly 210 for exothermic raw material, and then in-flowed into the through-hole 305 of the second plate 300.

Meanwhile, an inlet 221 formed on the heat exchange plate assembly 220 for exothermic reaction products is connected to a first inflow port 301 formed on the second plate 300, and an outlet 222 formed on the heat exchange plate assembly 220 for exothermic reaction products is connected to a through-hole 215 formed on the heat exchange plate assembly 210 for exothermic reaction raw material. Therefore, exothermic reaction products introduced from the second plate 300 flows along the fluid passages formed in the heat exchange plate assembly 220 for exothermic reaction products and are then discharged to an exhaust port 105 of the first plate 100 via the through-hole 215 formed on the heat exchange plate assembly 210 for exothermic reaction raw material. At this time, the exothermic reaction products with a high temperature of 500° C. or more that passes through the heat exchange plate assembly 220 for exothermic reaction products provides the exothermic reaction raw material that passes through the heat exchange plate assembly 210 for exothermic reaction raw material with heat to pre-heat exothermic reaction raw material by a temperature of about 500° C.

Of course, considering the heat transfer efficiency and the like, one or more heat exchange plate assemblies for exothermic reaction raw material to which exothermic reaction raw material such as combustion gases is introduced and one or more heat exchange plate assemblies for exothermic reaction products to which exothermic reaction products such as stack gases is introduced may be alternately laminated in such first unit 200.

The Second Plate 300

On the second plate 300 positioned below the first unit 200, a first inflow port 301 to which exothermic reaction products is introduced and a second inflow port 302 to which heat-exchanged endothermic reaction raw material is introduced are formed, and the through-hole 305 is formed for passing through heat-exchanged exothermic reaction raw material.

The through-hole 305 formed on the second plate 300 is connected to the through-hole 225 of the heat exchange plate assembly 220 for exothermic reaction products constituting the upper first unit 200 and an inlet 411 of the plate assembly 410 for exothermic reactions constituting the lower second unit 400 described below.

In addition, the first inflow port 301 is connected to an inlet 221 of the heat exchange plate assembly 220 for exothermic reaction products constituting the upper first unit 200, and the second inflow port 302 is connected to a through-hole 415 of the plate assembly 410 for exothermic reactions constituting the lower second unit 400.

The Second Unit 400

The second unit 400 is a part in which exothermic reaction raw material pre-heated in the first unit 200 is exothermically reacted to provide heat to be used in the endothermic reactions and to proceed an endothermic reactions of endothermic reaction raw material pre-heated in the third unit 600.

The second unit 400 positioned below the second plate 300 comprises the plate assembly 410 for an exothermic reactions and the plate assembly 420 for an endothermic reactions. Here, the configurations of the plate assembly 410 for exothermic reactions and the plate assembly 420 for endothermic reactions, which constitute the second unit 400, are the same as those of the heat exchange plate assembly 210 for exothermic reaction raw material and the heat exchange plate assembly 220 for exothermic reaction products, which constitute the first unit 200.

The through-hole 305 of the second plate 300 is connected to the inlet 411 formed on the plate assembly 410 for exothermic reactions, and an outlet 412 formed on the plate assembly 410 for exothermic reactions is connected to a through-hole 425 formed on the plate assembly 420 for endothermic reactions. Therefore, exothermic reaction raw material such as combustion gases in-flowed from the second plate 300 is subjected to exothermic reaction such as combustion reaction, with flowing along fluid passages formed in the plate assembly 410 for exothermic reactions, and then in-flowed into the first exhaust port 501 formed on the third plate 500 through which exothermic reaction products is discharged. Accordingly, exothermic reaction raw material passing through the plate assembly 410 for exothermic reactions continuously provide heat to endothermic reaction raw material passing through the plate assembly 420 for endothermic reactions to proceed the endothermic reactions.

On the other hand, an inlet 421 formed on the plate assembly 420 for endothermic reactions is connected to the second inflow port 302 formed on the second plate 300 via the through-hole 415 formed on the plate assembly 410 for exothermic reactions, and an outlet 422 formed on the plate assembly 420 for endothermic reactions is connected to a through-hole 505 formed on the third plate 500. Therefore, endothermic reaction raw material in-flowed from the second plate 300 is subjected to endothermic reaction, with flowing along fluid passages formed within the plate assembly 420 for endothermic reactions, passes through the through-hole 505 formed on the third plate 500, and are then in-flowed into a heat exchange plate assembly 620 for endothermic reaction products of the third unit 600.

Of course, considering the reaction capacity, one or more plate assemblies for exothermic reactions and one or more plate assemblies for endothermic reactions may be alternately laminated in the second unit 400 as described above. In the present invention, in addition, the fluid passages formed within the plate assembly for exothermic reactions may be coated with a catalyst for exothermic reactions, and the fluid passages formed within the plate assembly for endothermic reactions may be coated with a catalyst for endothermic reactions.

Particular kinds of catalysts for exothermic reactions and endothermic reactions are not specifically limited. Depending on kinds of reactions being proceeding, usual catalysts in chemical fields may be used without limitation. For example, if the chemical reactor of the present invention is used in a reforming reaction of hydrocarbons, the catalyst for exothermic reactions may be a catalyst for combustion, and the catalyst for endothermic reactions may be a reforming catalyst. At this time, the catalyst for combustion is not specifically limited, as long as it can be used in catalyzing oxidation of hydrocarbons or alcohols, and the like. Examples of such catalyst for combustion may be one or more selected from the group consisting of a platinoid element such as platinum (Pt), rhodium (Rh), ruthenium (Ru), osmium (Os), iridium (Ir), and palladium (Pd); a precious metal element such as gold (Au), silver (Ag), and copper (Cu); or a mixture thereof. In addition, the catalyst for combustion may be used by supporting it on a catalyst support such as aluminum oxide, $\alpha,\gamma,\theta$-aluminum oxide, cerium oxide ($CeO_2$), zirconium oxide ($ZrO_2$) and/or silica ($SiO_2$) and the like In addition, examples of the reforming catalyst may be one or more selected from platinum (Pt), rhodium (Rh), ruthenium (Ru), nickel (Ni), alkali metal oxides, alkali earth metal oxides (for example, CaO, $K_2O$, or MgO) and a mixture thereof, or one or more selected from the group consisting of a composite of $Cu/CeO_2/ZrO_2$, a composite of $Cu/ZnO_2/Al_2O_3$, a composite of $Cu/CeO_2/Al_2O_3$, a composite of $Cu/ZrO_2/Al_2O_3$, or a solid-solution of copper-zinc-aluminum (CuZnAl) oxide. In addition, the reforming catalyst may also be used by supporting it on a catalyst support such as aluminum oxide, $\alpha,\gamma,\theta$-aluminum oxide, cerium oxide ($CeO_2$), zirconium oxide ($ZrO_2$) and/or silica ($SiO_2$) and the like.

The Third Plate 500

On the third plate 500 positioned below the second unit 400, a first exhaust port 501 for discharging exothermic reaction products and a second exhaust port 502 for discharging heat-exchanged endothermic reaction raw material are formed, and a through-hole 615 for passing the heat-exchanged endothermic reaction products is formed.

The through-hole 505 formed on the third plate 500 is connected to an outlet 422 formed on the plate assembly 420 for endothermic reactions constituting the upper second unit 400 and the through-hole 615 of the heat exchange plate assembly 610 for endothermic reaction raw material constituting the lower third unit 600.

In addition, the first exhaust port 501 is connected to the first inflow port 301 of the second plate 300, and the second exhaust port 502 is connected to the second inflow port 302 of the second plate 300.

The Third Unit 600

The third unit 600 is a part that endothermic reaction raw material and endothermic reaction products is heat-exchanged, and comprises the heat exchange plate assembly 610 for endothermic reaction raw material located below the third plate 500 and the heat exchange plate assembly 620 for endothermic reaction products, endothermic reaction raw material are in-flowed to the heat exchange plate assembly for endothermic reaction raw material and endothermic reaction products is in-flowed to the heat exchange plate assembly for endothermic reaction products. Here, the configurations of the heat exchange plate assembly 610 for endothermic reaction raw material and the heat exchange plate assembly 620 for endothermic reaction products, constituting the third unit 600, are the same as those of the heat exchange plate assembly 210 for exothermic reaction raw material and the heat exchange plate assembly 220 for exothermic reaction products, constituting the first unit 200.

An inflow port 701 of the fourth plate 700 is connected to an inlet 611 formed on the heat exchange plate assembly 610 for endothermic reaction raw material, and an outlet 612 formed on the heat exchange plate assembly 610 for endothermic reaction raw material is connected to the second exhaust port 502 formed on the third plate 500. Therefore, endothermic reaction raw material in-flowed from the fourth plate 700 flows along fluid passages formed within the heat exchange plate assembly 610 for endothermic reaction raw material, and then are in-flowed into the second exhaust port 502 of the third plate 500.

On the other hand, an inlet 621 formed on the heat exchange plate assembly 620 for endothermic reaction products is connected to the through-hole 615 formed on the heat exchange plate assembly 610 for endothermic reaction raw material, and an outlet 222 formed on the heat exchange plate assembly 620 for endothermic reaction products is connected to an exhaust port 702 formed on the fourth plate 700. Therefore, endothermic reaction products generated by an endothermic reaction and in-flowed from the third plate 500 flow along fluid passages formed within the heat exchange plate assembly 620 for endothermic reaction products and are then discharged via the exhaust port 702 formed on the fourth plate 700. Accordingly, the endothermic reaction products at a high temperature of 650° C. or more that passes through the heat exchange plate assembly 620 for endothermic reaction products provides heat to endothermic reaction raw material passing through the heat exchange plate assembly 610 for endothermic reaction raw material to pre-heat endothermic reaction raw material by a temperature of about 500° C. or more.

Of course, considering heat transfer efficiency, one or more heat exchange plate assemblies for endothermic reaction raw material and one or more heat exchange plate assemblies for endothermic reaction products may be alternately laminated in the third unit 600.

The Fourth Plate 700

The fourth plate 700 acts as a cove of the bottom of reactor. On the fourth plate 700, an inflow port 701 for supplying endothermic reaction raw material and an exhaust port 702 for discharging endothermic reaction products are formed. Endothermic reaction raw material is introduced into the inflow port and endothermic reaction products is discharged through the exhaust port.

The inflow port 701 is connected to the inlet 611 of the heat exchange plate assembly 610 for endothermic reaction raw material via a through-hole 625 of the heat exchange plate assembly 620 for endothermic reaction products of the third unit 600, and the exhaust port 702 is connected to the outlet 622 of the heat exchange plate assembly 620 for endothermic reaction products of the third unit 600.

The plate assemblies constituting the first to third units are explained in more detail below, with reference to FIGS. 3 to 6.

Figure 3:
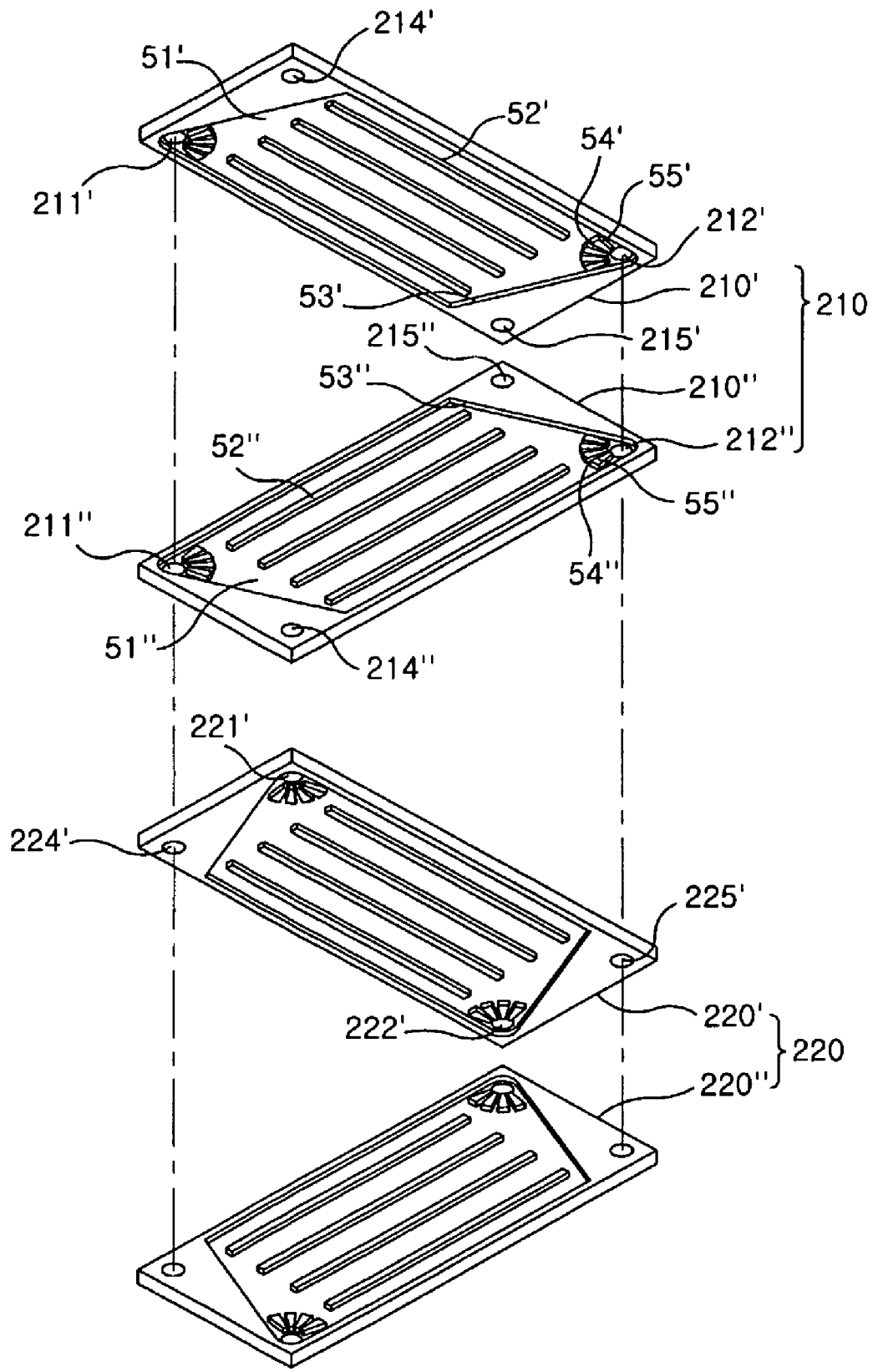
FIG. 3 is an exploded perspective view of plate assemblies constituting the chemical reactor of FIG. 2.

FIG. 3 is an exploded perspective view depicting the disassembled heat exchange plate assemblies 210 and 220 of the first unit 200. As shown in FIG. 3, in the plate assembly according to the present invention, one or more micro fluid passages are formed by joining the first channel plate 210' or 220' having one or more micro channels formed on a lower surface thereof and the second channel plate 210" or 220" having one or more micro channels formed on an upper surface thereof and corresponding to micro channels of the first channel plate. The second channel plates 210" and 220" of the micro channel plates are the same as the first channel plates 210' and 220', except for having a symmetrical structure in a mirror image. Below, accordingly, the same reference numerals are given to the same members, but they are distinguished and represented by mark (").

Figure 5:
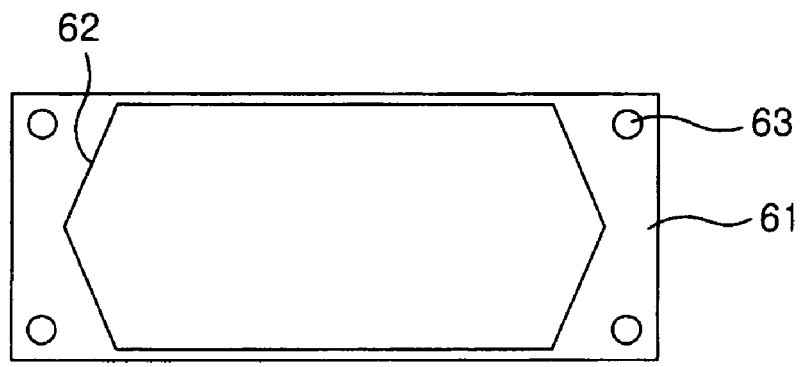
FIG. 5 is a plane view of a gasket used in a plate assembly according to the present invention.

A as shown in FIG. 5, a gasket 61 may be interposed between the micro channel plates 210' and 220', 210" and 220". The gasket 61 may preferably made of a copper plate. Openings 62 and through-holes 63 are formed on the gasket for forming certain space between the micro channel plates 210' and 220', 210" and 220".

Figure 4:
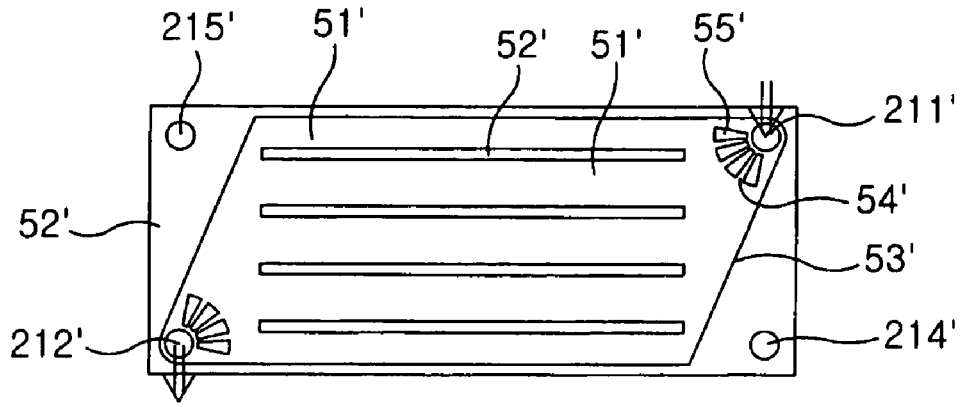
FIG. 4 is a plane view of a channel plate constituting the plate assemblies of FIG. 3.

As shown in FIGS. 3 and 4, concave portions with a certain depth are formed at insides of the micro channel plates 210', 220', 210" and 220". Inlets 211' and 211" and outlets 212' and 212" diagonally positioned against each other are formed in the concave portion, and the through-holes 214' and 215' diagonally positioned against each other are also formed on a periphery of the outer concave portions. In addition, a wall 53' of concave portion serves as a barrier for controlling flow direction of raw material or reaction products passing through micro channels. The micro channels 51' in the inside of concave portion are divided by one or more partitions 52' and 52" to form plural channels.

Figure 6:
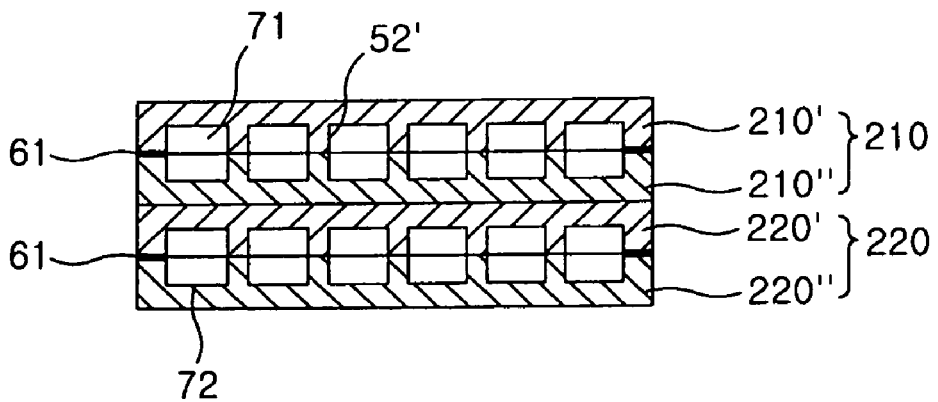
FIG. 6 is a side cross-sectional view of a plate assembly constituting the chemical reactor of FIG. 2.

As shown in FIG. 6, a number of spaces 71 [micro fluid passages] are formed in the inside of each plate assembly for forming channels. In addition, in the plate assemblies for endothermic reaction and exothermic reaction, coating parts may be formed by applying catalyst for exothermic reaction or catalyst for endothermic reaction on the inside walls.

In addition, as shown in FIG. 4, a number of converging grooves 54' and converging projections 55' are formed near the inlet 211' and the outlet 212' for restricting flow of raw material or reaction products so as to diffuse or collect raw material or reaction products from the inlet 211' or the outlet 212' to plural micro channels 51'.

INDUSTRIAL APPLICABILITY

The above chemical reactor including heat exchangers, according to the present invention, minimizes an exposure of flows of exothermic reaction raw material and endothermic reaction raw material to an outside to reduce the volume of reactor and simultaneously minimize heat loss.

In addition, the heat efficiency is improved by placing the heat exchangers on both wide surfaces of the chemical reactor and using heat transferred via the surface of reactor in the heat exchangers. Exothermic reaction raw material and endothermic reaction raw material are pre-heated by heat-exchanging exothermic reaction products and endothermic reaction products with exothermic reaction raw material and endothermic reaction raw material and then introduced into the plate assemblies for exothermic reaction and endothermic reactions, and so the exothermic reactions and the endothermic reactions may be effectively carried out. Especially, the heat exchange plate assemblies and the plate assemblies for reactions are disposed in a contact state so that the heat exchange can be effectively occurred.

Moreover, there is the advantage that the volume of the reactor can be remarkably reduce by disposing in order the first plate, the first unit, the second plate, the second unit, the third plate, the third unit and the fourth plate in stack state.

The invention claimed is:

1. A chemical reactor, comprising;
   a first unit including one or more heat exchange plate assemblies for exothermic reaction raw material and one or more heat exchange plate assemblies for exothermic reaction products, a heat exchange between exothermic reaction products and exothermic reaction raw material being performed in the first unit;
   a second unit including one or more plate assemblies for exothermic reaction and one or more plate assemblies for endothermic reaction, the second unit providing heat generated through an exothermic reaction of said exothermic reaction raw material to endothermic reaction raw material to proceed the endothermic reaction; and
   a third unit including one or more heat exchange plate assemblies for endothermic reaction raw material and one or more heat exchange plate assemblies for endothermic reaction products, a heat exchange between endothermic reaction products and endothermic reaction raw material being performed in the third unit.

2. The chemical reactor of claim 1, wherein
   the exothermic reactions are combustion reactions of combustion gases, and
   the endothermic reactions are reforming reactions for reforming hydrocarbon raw material to produce hydrogen.

3. The chemical reactor of claim 1, further comprising
   a first plate for supplying exothermic reaction raw material to the heat exchange plate assembly for exothermic reaction raw material and discharging exothermic reaction products introduced from the heat exchange plate assembly for exothermic reaction products;
   a second plate for supplying exothermic reaction raw material introduced from the heat exchange plate assembly for exothermic reaction raw material to the plate assembly for exothermic reaction, and discharging endothermic reaction raw material and exothermic reaction products introduced from a third plate to the plate assembly for endothermic reaction and the heat exchange plate assembly for exothermic reaction products, respectively;

a third plate for supplying endothermic reaction raw material introduced from the heat exchange plate assembly for exothermic reaction raw material and exothermic reaction products introduced from the plate assemblies for exothermic reaction to the second plate, and supplying endothermic reaction products introduced from the plate assembly for endothermic reaction to the heat exchange plate assembly for endothermic reaction products; and a fourth plate for supplying endothermic reaction raw material to the heat exchange plate assembly for endothermic reaction raw material, and discharging endothermic reaction products introduced from the heat exchange plate assembly endothermic reaction products.

4. The chemical reactor of claim 3, wherein the first plate, the first unit, the second plate, the second unit, the third plate, the third unit and the fourth plate are laminated in order.

5. The chemical reactor of claim 1, wherein the first unit is formed such that the heat exchange plate assemblies for exothermic reaction raw material and the heat exchange plate assemblies for exothermic reaction products are alternatively laminated.

6. The chemical reactor of claim 1, wherein the second unit is formed such that the plate assemblies for exothermic reaction and the plate assemblies for endothermic reaction are alternatively laminated.

7. The chemical reactor of claim 1, wherein the third unit is formed such that the heat exchange plate assemblies for endothermic reaction raw material and the heat exchange plate assemblies for endothermic reaction products are alternately laminated.

8. The chemical reactor of claim 1, wherein the plate assembly comprises a first channel plate and a second channel plate joined each other, and one or more micro fluid passages are formed therein.

9. The chemical reactor of claim 8, wherein, the plate assembly has an inlet and outlet communicated in fluid to an inside thereof and through-holes perforating thereof.

10. The chemical reactor of claim 9, wherein, the plate assembly has control walls formed therein and allowing to diffuse in-flowed raw material or reaction products from the inlets or converge it to the outlets.

11. The chemical reactor of claim 1, wherein the plate assembly for exothermic reaction comprises a catalyst for exothermic reaction in which active ingredient is supported on one or more supports selected from the group consisting of aluminum oxide, $\alpha,\gamma,\theta$-aluminum oxide, $CeO_2$, $ZrO_2$ and $SiO_2$, and the active ingredient is one or more selected from the group consisting of Pt, Rh, Ru, Os, Ir, Pd, Au, Ag and Cu.

12. The chemical reactor of claim 1, wherein the plate assembly for endothermic reaction comprises a catalyst for endothermic reaction in which active ingredient is supported on one or more supports selected from the group consisting of aluminum oxide, $\alpha,\gamma,\theta$-aluminum oxide, $CeO_2$, $ZrO_2$ and $SiO_2$, and the active ingredient is one or more selected from the group consisting of Pt, Rh, Ru, Ni, alkali metal oxides, and alkali earth metal oxides, or one or more selected from the group consisting of a composite of $Cu/CeO_2/ZrO_2$, a composite of $Cu/ZnO_2/Al_2O_3$, a composite of $Cu/CeO_2/Al_2O_3$, a composite of $Cu/ZrO_2/Al_2O_3$, and a solid-solution of Cu—Zn—Al oxide.

* * * * *